Figure 1:
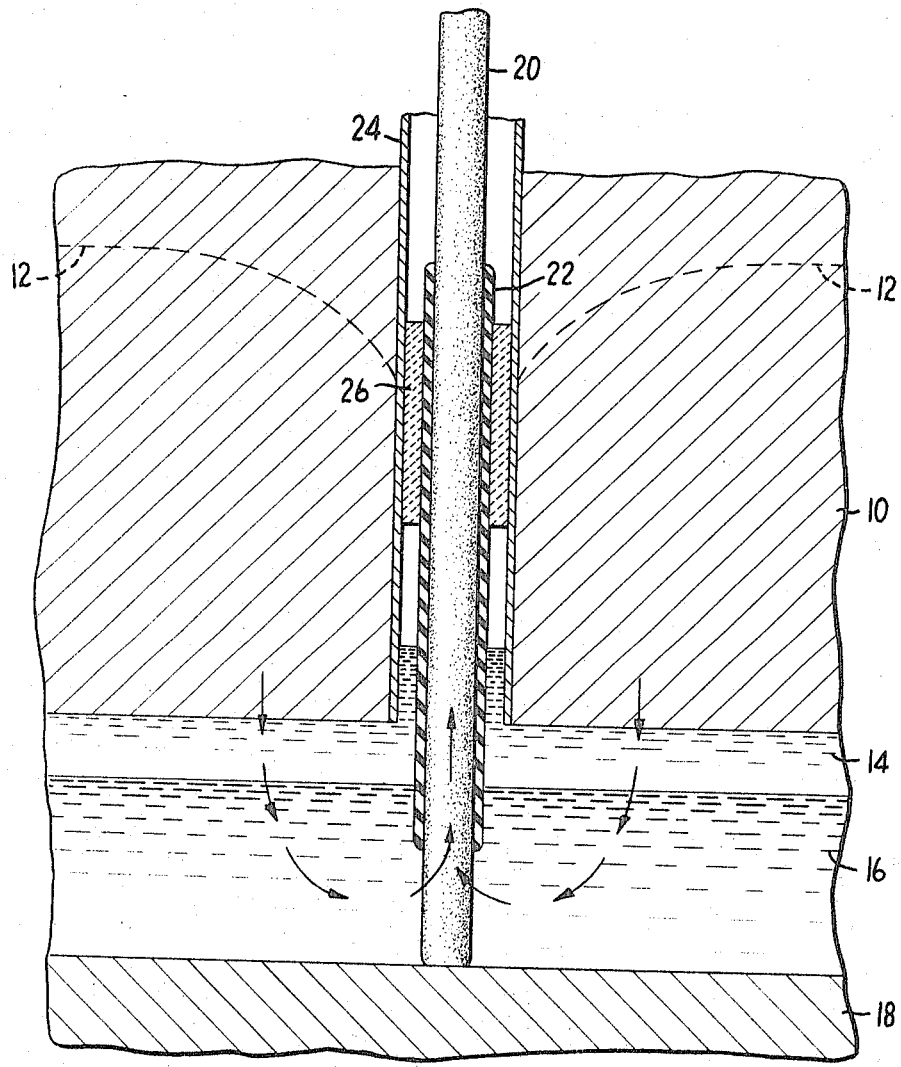

United States Patent Office 3,322,658
Patented May 30, 1967

3,322,658
ALUMINUM ELECTROLYTIC CELL AND
METHOD OF USE
Mathias O. Sem, Smestad, Oslo, Norway, assignor to Elektrokemisk A/S, Oslo, Norway, a corporation of Norway
Filed Feb. 28, 1963, Ser. No. 261,619
Claims priority, application Norway, Mar. 5, 1962, 143,498
12 Claims. (Cl. 204—67)

Continuous self-baking anodes are widely used today in the production of aluminum by melt electrolysis. In these furnaces direct current of high amperage passes from the anode into a molten cryolite bath where the melt electrolysis takes place. The current then flows into a pool of liquid aluminum in the bottom of the furnace and through the lining of the furnace to iron cathode rods connected to suitable bus bars under the furnace pot.

The furnace lining usually consists of carbon blocks with iron cathode rods prebaked in the blocks. During operation, temperature variations cause the carbon blocks to crack and gradually disintegrate so that the iron rods become exposed to the liquid aluminum which will then absorb iron. When this occurs the furnace must be shut down and a new bottom installed. The lining in such a furnace will last for only about three to five years and renewing the lining is an expensive operation not only because of labor and materials but also because of loss of production during the shut down. A conventional type of furnace described above is illustrated in U.S. Patent No. 2,999,801.

These drawbacks of the conventional type furnace are overcome in accordance with the present invention by inserting rods of electrically conductive material down through the anode into the pool of liquid aluminum in the bottom of the furnace pot. The rods serve as cathodes for conducting electric current up through the anode to bus bars positioned above the furnace.

The cathode rods are of course electrically insulated from the anode and the molten cryolite bath. This is not a very difficult task since the voltage in the anode is only in the neighborhood of about 4.5 volts. The rods may be electrically insulated by means of a coating such as silicon nitride-bonded silicon carbide (Refrax) which is applied to that portion of the rod which passes through the anode, and molten cryolite bath. The cathode rods should be able to withstand the temperature in the furnace and resist attack by the cryolite bath and liquid aluminum. Known electrically conductive materials suitable for this purpose include borides or carbides of titanium, zirconium etc.

In a preferred form of structure open channels are formed in the anode by means of aluminum tubes having an inside diameter greater than the outside diameter of the cathode rods. The aluminum tubes become baked into the anode and the cathode rods are inserted down through the hollow core of the tubes and into the liquid aluminum in the bottom of the furnace. Additional lengths are added to elongate the aluminum tubes as the anode is gradually consumed in the furnace.

If desired the aluminum tubes may be associated with the gas collection system so that a part of the gas generated in the furnace may be exhausted through the tubes. Or a cover may be fitted to the lip of the hollow tubes to prevent loss of furnace gas. The cover should of course be an electric insulating material but it need not be a refractory material since the temperature is quite low at the top of the unbaked portion of the anode. The inside diameter of the aluminum tubes may be made large enough to accommodate a plurality of cathode rods and if desired rectangular or square open channels may be employed which will accommodate one or more cathode rods. The aluminum tubes are consumed in the furnace along with the anode.

Permanent tubes may also be employed and in such case the tubes are periodically loosened and raised to a higher level in the anode before they reach the molten cryolite bath. This may be done in the same manner now employed for raising the conventional vertical iron contact studs which support and supply the electrical current to the anode. The lower portion of the permanent tube may be of conical shape to facilitate loosening the tube from the baked portion of the anode or the tubes may be threaded so that they may be screwed upwardly in the anode as the anode is consumed in the furnace pot. If permanent tubes are employed the outer surface should be given a protective coating such as titanium carbide which will resist absorption of carbon and corrosion by the sulfur containing gases generated in the furnace. The permanent tubes may be made of iron in which case they can be used in place of conventional vertical contact studs for suspending and supplying current to the anode.

The cathode rods of the present invention may with advantage be electrically insulated from the anode by filling the annular space between the contact rod and anode with aluminum oxide. The aluminum oxide will provide the necessary electrical insulation and at the same time it will provide a seal to prevent furnace gas from escaping through the hollow tube. The aluminum oxide may in this way be continuously introduced into the furnace pot and if fluorides are mixed with the aluminum oxide the mixture will be sintered by the heat of the furnace.

As will be obvious to those skilled in the art care must be taken to maintain a sufficient amount of liquid aluminum in the bottom of the furnace to avoid an exceedingly high concentration of current in the metal. For this purpose the depth of the liquid aluminum in conventional furnaces will usually be in the neighborhood of about twenty centimeters or more.

The electric current in each cathode rod should be limited to about 4,000 to 5,000 amperes, as otherwise there may be a pinch effect which will force the surface of the liquid aluminum down around each rod. In a furnace of 100,000 ampere capacity about twenty-five cathode rods will be sufficient for avoiding the pinch effect.

These and further advantages and the details of preferred forms of structure of the present invention will be readily understood by those skilled in the art in connection with the description of the schematic illustrations shown in the drawings in which:

FIG. 1 is a schematic illustration of a vertical section through a portion of a furnace pot for the melt electrolysis of aluminum in which the anode is equipped with the cathode rods of the present invention.

Figure 2A:
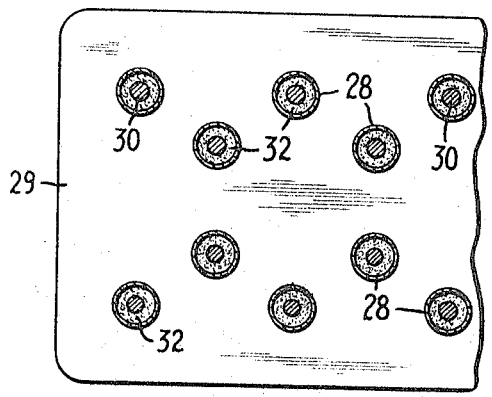
Figure 3:
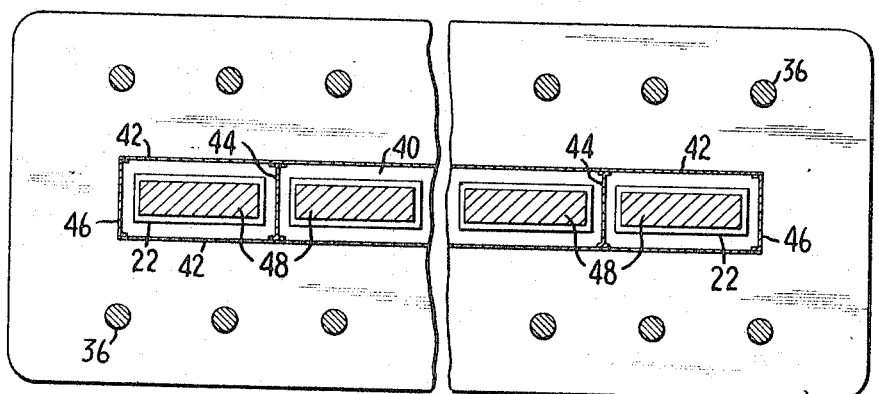

FIG. 2(a) and (b) and FIG. 3 are schematic illustrations of horizontal sections through an anode showing different ways in which the cathode rod of the present invention may be arranged.

In the drawings, 10 is a continuous self-baking anode. The dotted line 12 indicates the baking zone in which the soft unbaked electrode paste is baked and hardened by the heat of the furnace. Anode 10 is suspended in the molten cryolite bath 14 as by means of conventional vertical contact studs (not shown) which also supply the electric current to the anode. The liquid aluminum illustrated at 16 collects in a pool on the lining 18 in the bottom of the furnace. The electric current passes from the anode through the cryolite bath where melt electrolysis takes place and then into the liquid aluminum. In accordance with the present invention there are no cathode contact rods in the lining at the bottom of the furnace. Otherwise all of the parts described hereinabove are of conventional construction well known in the art. For example U.S. Patent No. 2,475,452 illustrates one form of such a furnace for the melt electrolysis of aluminum.

In accordance with the present invention the cathode rod 20 has an electric insulating coating or sleeves 22 which insulates the rod from the anode and cryolite bath. The lower end portion of the cathode rod is positioned in the liquid aluminum, and electric current passes from the liquid aluminum into the cathode rod below sleeve 22. The rod conducts the current upwardly through the anode to conventional bus bars (not shown). The cathode rod is preferably centered in an aluminum tube 24 by means of a spacer 26 which may be any conventional form of non-conductive refractory material conventionally used in electrical furnaces.

FIG. 2(a) illustrates the use of permanent tubes 28 which are made of iron so that the tubes may be used in place of the conventional vertical contact studs for supporting and supplying electric current to the anode 29. Cathode rods 30 are positioned within the hollow core of the tubes and the rods are electrically insulated from the iron tubes by means of aluminum oxide 32 which is continuously fed into the annular space between the contact rod and the inside of the iron tube. The aluminum oxide descends down through the tubes and into the furnace pot.

Figure 2B:
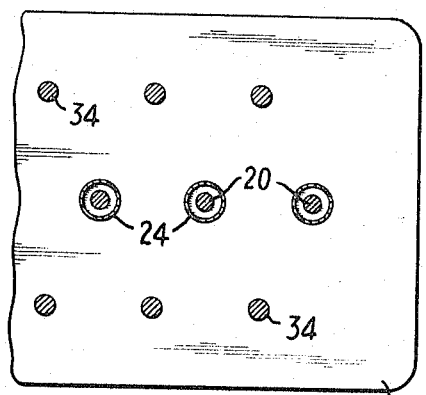

FIG. 2(b) shows an alternate arrangement made in accordance with the present invention wherein two rows of conventional vertical contact studs 34 are employed for supporting and feeding electric current to the anode 35 in conventional manner such as for example as that illustrated in U.S. Patent No. 2,475,452. A row of cathode rods 20 with aluminum tubes 24 are arranged in the anode and furnace pot as described in connection with the structure of FIG. 1. The cathode rods are positioned in the middle of the two rows of vertical contact studs 34. An advantage of the arrangement illustrated in FIG. 2(b) is that the anode and cathode bus bars may be arranged beside each other in parallel and eventually in an interleaved position. The oppositely directed currents in the bus bars will reduce the magnetic field to a minimum throughout the furnace area and the known pile-ups of the liquid aluminum at one end of the furnace pot caused by the magnetic field in furnaces of conventional construction will not occur. The number of rows of contact studs and cathode rods is not critical and any desired number of rows of studs and rods may be employed.

In the structure illustrated in FIG. 3 two rows of conventional vertical contact studs 36 are employed for supporting and supplying electric current to the anode 38. The two opposite side walls of an open channel 40 which extends down through the anode is formed by means of two thin aluminum sheets 42 which are about 0.3 mm. thick. The aluminum sheets are in rolls (not shown) supported above the anode and since the aluminum sheets will be bounded to the baked electrode paste they will be drawn down and unrolled as the anode moves down in the furnace pot during operation. Reinforcing cross members 44 preferably of aluminum metal are provided in the area of the unbaked soft electrode paste to preserve the desired space between the two aluminum sheets.

The two opposite end walls of channel 40 are formed by means of two permanent stationary cross members 46. The members 46 extend down into the baked portion of the electrode. As the electrode is consumed the members are moved upwardly and thereafter the baked electrode paste forms the two opposite end walls of the channel. A plurality of cathode rods 48 of generally rectangular shape are positioned within the open channel 40 and these cathode rods are insulated from the anode and molten cryolite bath in the same manner previously described for the cathode rods illustrated in FIG. 1.

In the preferred forms of structure described above the cathode rod is covered with electric insulation in the area of the molten cryolite bath, to prevent current from passing through the molten bath to the rod without going through the liquid aluminum. It will be understood however that if the resistance of the cathode rod is slightly greater than the resistance of the molten cryolite bath the insulating coating is not necessary. In such case the current will flow into the liquid aluminum before it enters the cathode rod.

It will also be understood that it is intended to cover all changes and modifications of the preferred embodiment of the invention herein chosen for the purpose of illustration which do not constitute departures from the spirit and scope of the invention.

I claim:

1. In an electric furnace for the melt electrolysis of aluminum of the type in which liquid aluminum metal is collected in the bottom of the furnace beneath a molten cryolite bath, the structure which comprises a continuous self-baking anode, cathode rods that extend down through the anode and into the liquid aluminum metal in the bottom of the furnace and electric insulating means which insulate said rods from the anode and molten cryolite bath.

2. A structure as specified in claim 1 in which the cathode rods are positioned within open channels that extend through the anode.

3. A structure as specified in claim 2 in which the wall of the open channel is an aluminum tube.

4. A structure as specified in claim 2 in which the wall of the open channel is an iron tube adapted to supply electric current to the anode.

5. A structure as specified in claim 2 in which a plurality of cathode rods are positioned in each said open channel.

6. A structure as specified in claim 2 in which the open channel is in the general shape of a rectangle and in which two opposite side walls in the channel are formed of sheets of aluminum and the second two opposite side walls are formed by permanent forming members.

7. A structure as specified in claim 1 in which the electric insulating means include aluminum oxide.

8. A structure as specified in claim 1 in which the electric insulating means include a sleeve of electric insulating material positioned on the cathode rod to insulate it from the anode and molten cryolite bath.

9. A structure as specified in claim 1 in which said furnace contains only a single anode.

10. In the operation of an electrolytic aluminum smelting furnace which includes a furnace pot having a pool of molten aluminum on the bottom thereof, a molten electrolytic bath with dissolved alumina therein resting upon said pool and a self-baking anode suspended above and in contact with said bath, the method comprising supplying direct electric current to said anode, flowing said current from said anode to and through first said electrolytic bath and then said pool of molten aluminum, returning said current to its source along a plurality of paths insulated from and leading up through said electrolytic bath and the body of said anode, and passing said return flow of current through each said return path at a density not exceeding about 5,000 amperes.

11. The method of claim 10 which includes the steps of spacing at least one said return path away from the body portion of said anode and supplying alumina to said electrolytic bath by dropping said alumina down through said space.

12. The method of claim 10 which includes the step of maintaining said pool of molten aluminum at a depth of at least about 20 cm.

References Cited

UNITED STATES PATENTS

| 2,713,024 | 7/1955 | Manovanello | 204—245 X |
| 2,917,441 | 12/1959 | Donald | 204—247 X |

FOREIGN PATENTS

| 813,216 | 5/1959 | Great Britain. |
| 898,449 | 6/1962 | Great Britain. |

WINSTON A. DOUGLAS, *Primary Examiner.*

JOHN H. MACK, *Examiner.*

A. B. CURTIS, *Assistant Examiner.*